United States Patent
Lee et al.

(10) Patent No.: US 9,587,704 B2
(45) Date of Patent: Mar. 7, 2017

(54) SYSTEM AND METHOD FOR MANAGING NOISE AND VIBRATION IN A VEHICLE USING ELECTRO-DYNAMIC REGENERATIVE FORCE AND VEHICLE HAVING SAME

(71) Applicant: GM GLOBAL TECHNOLOGY OPERATIONS LLC, Detroit, MI (US)

(72) Inventors: Ping Lee, Kitchener (CA); Sam M. Jomaa, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 456 days.

(21) Appl. No.: 13/959,129

(22) Filed: Aug. 5, 2013

(65) Prior Publication Data

US 2015/0034797 A1 Feb. 5, 2015

(51) Int. Cl.
*F16F 13/26* (2006.01)
*F16F 15/00* (2006.01)

(52) U.S. Cl.
CPC .......... *F16F 15/005* (2013.01); *F16F 13/264* (2013.01)

(58) Field of Classification Search
CPC ........ F16F 13/26; F16F 13/264; F16F 13/266; F16F 13/268; F16F 15/03; F16F 15/035; F16F 2222/06
USPC ....................................... 267/140.14, 140.15
See application file for complete search history.

(56) References Cited

U.S. PATENT DOCUMENTS

| | | | | |
|---|---|---|---|---|
| 4,624,435 A | * | 11/1986 | Freudenberg | F16F 15/03 180/300 |
| 5,570,286 A | * | 10/1996 | Margolis | B60G 13/14 180/165 |
| 5,779,231 A | * | 7/1998 | Okazaki | F16F 13/26 267/140.14 |
| 5,906,254 A | * | 5/1999 | Schmidt | F16F 7/1005 188/378 |
| 5,957,440 A | * | 9/1999 | Jones | F16F 7/1005 244/54 |
| 6,105,943 A | * | 8/2000 | Nagasawa | F16F 13/264 267/140.14 |
| 6,315,277 B1 | * | 11/2001 | Nagasawa | F16F 13/264 267/140.14 |

(Continued)

FOREIGN PATENT DOCUMENTS

| | | | |
|---|---|---|---|
| CN | 101225864 A | | 7/2008 |
| JP | 04312229 A | * | 11/1992 |
| JP | 06109057 A | * | 4/1994 |

*Primary Examiner* — Bradley King
*Assistant Examiner* — Stephen Bowes
(74) *Attorney, Agent, or Firm* — Quinn Law Group, PLLC

(57) ABSTRACT

A system for managing noise and vibration in a vehicle includes a housing defining an internal cavity. A compliant member is attached to the housing and further defines the internal cavity. A magnet is operatively fixed to the housing in the cavity and has a magnetic field. A coil is positioned in the cavity and is configured so that there is relative movement between the coil and the magnet in the magnetic field in response to movement of the compliant member relative to the housing. A resistor is in electrical communication with the coil to form an electrical circuit. Relative movement of the coil in the magnetic field induces a current in the circuit that creates an opposing magnetic field, thereby reducing transmitted dynamic forces.

12 Claims, 3 Drawing Sheets

(56) References Cited

U.S. PATENT DOCUMENTS

| | | | | |
|---|---|---|---|---|
| 2005/0006830 A1* | 1/2005 | Nemoto | ................ | F16F 13/264 |
| | | | | 267/140.14 |
| 2005/0200328 A1* | 9/2005 | Edson | .................. | G05B 19/404 |
| | | | | 318/611 |
| 2007/0241489 A1* | 10/2007 | Mizushima | ............. | F16F 15/03 |
| | | | | 267/140.14 |
| 2009/0273147 A1* | 11/2009 | Inoue | ..................... | B60G 17/06 |
| | | | | 280/5.51 |

* cited by examiner

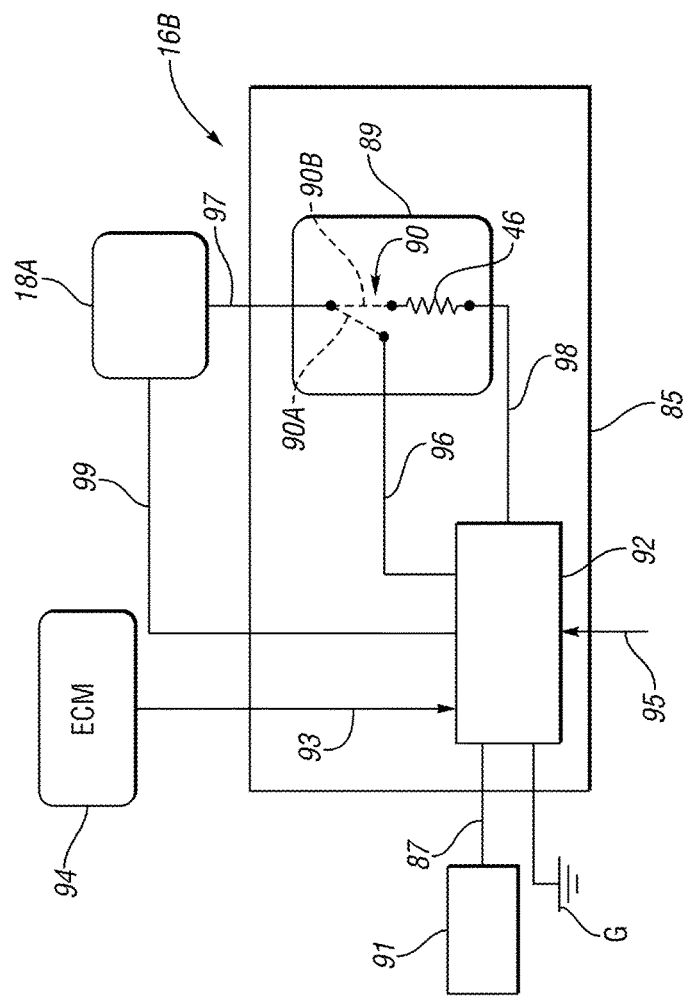
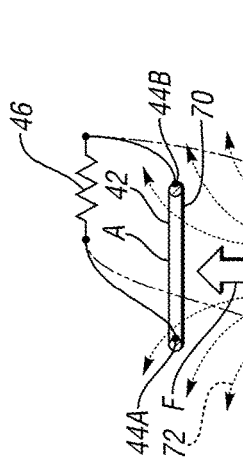
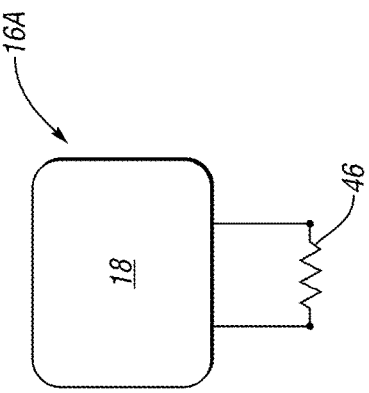
FIG. 4
FIG. 2
FIG. 3

SYSTEM AND METHOD FOR MANAGING NOISE AND VIBRATION IN A VEHICLE USING ELECTRO-DYNAMIC REGENERATIVE FORCE AND VEHICLE HAVING SAME

TECHNICAL FIELD

The present teachings generally include a system for managing noise and vibration in a vehicle using electro-dynamic regenerative force.

BACKGROUND

A vehicle has hundreds of interconnected components. Movement of one or more of these components relative to the other components is managed with dampers and mounts. For example, noise and vibration of the engine due to periodic firing in the cylinders is managed to control transmission to the vehicle body through the use of engine mounts. Some engine mounts are considered passive systems because they rely on hydraulic or damping mechanisms to manage noise and vibration transmission without active controls. Other engine mounts are considered active systems because an electronic controller ultimately controls the operation of the engine mount using feedback of vehicle operating parameters. Active engine mounts are generally more complex and more expensive than passive engine mounts.

SUMMARY

A system for managing noise and vibration in a vehicle includes a housing defining an internal cavity. A compliant member is attached to the housing and further defines the internal cavity. A magnet is operatively fixed to the housing in the cavity and has a magnetic field. A coil is positioned in the cavity and is configured such that there is relative movement between the coil and the magnet in the magnetic field in response to movement of the compliant member relative to the housing.

A resistor can be placed in electrical communication with the coil to form an electrical circuit. Movement of the coil in the magnetic field induces a current in the circuit that creates an opposing magnetic field proportional to the relative movement between the coil and the magnetic field, thereby reducing the transmitted dynamic forces In other words, the induced current creates a regenerative force that opposes a force applied to the compliant member. Because the induced current is automatically generated and is automatically proportionate to the applied force, the system is referred to as a passive system. In other embodiments, the system can be active, such as by controlling a switch that allows current from a battery to be supplied to the coil in a first position, and closes the circuit with the resistor in a second position. When the switch is in the first position, the actively supplied current can create additional motion of the coil. A processor can execute a stored algorithm by which the processor moves the switch to the first position to place the battery in communication with the coil only during predetermined vehicle operating parameters, such as vibration above a predetermined frequency.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 2 is a schematic illustration of a coil and a magnet of the electro-dynamic mount of FIG. 1, showing the coil moved to a second position in phantom.

FIG. 3 is a schematic illustration of the passive electro-dynamic mount of FIG. 1.

FIG. 4 is a schematic illustration of a second embodiment of a system for the vehicle of FIG. 1 with an actively-controlled electro-dynamic mount in accordance with an alternative aspect of the present teachings.

DETAILED DESCRIPTION

Figure 1:
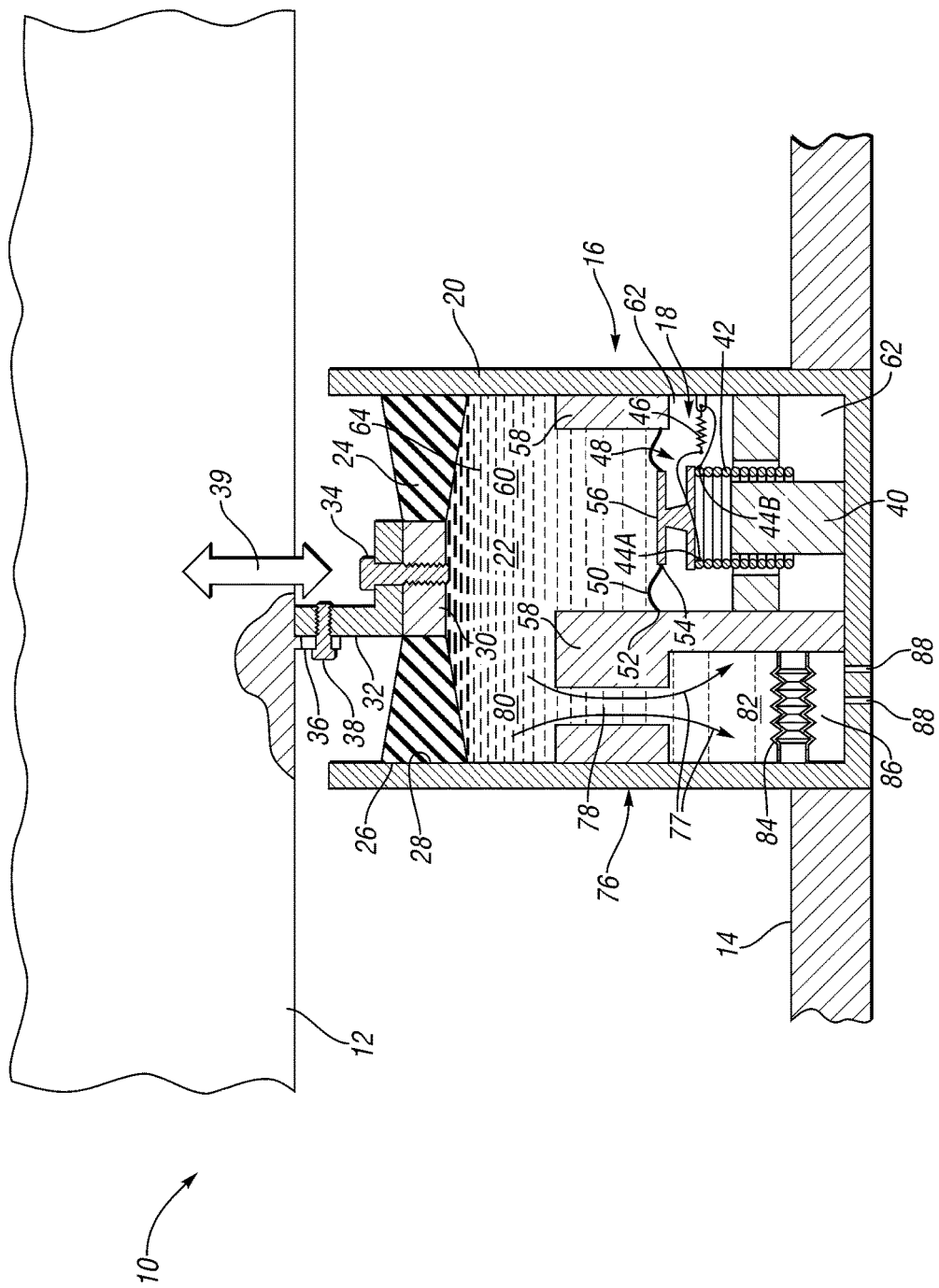
FIG. 1 is a schematic illustration of a vehicle in partial cross-sectional and fragmentary view having a first embodiment of a system for managing noise and vibration with a passive electro-dynamic mount.

Referring to the drawings, FIG. 1 shows a vehicle 10 that includes a first vehicle component, which in this embodiment is an engine 12, operatively mounted with respect to a second vehicle component, which in this embodiment is the vehicle body 14. The vehicle components are not limited to an engine and a vehicle body, and instead can be any two components between which it is desired to manage (passively or actively) the transmission of vibration and noise. For example, the first vehicle component could be a transmission, and the second vehicle component could be a vehicle frame. As explained in further detail herein, the vehicle 10 includes a vibration and noise management system 16 that includes an electro-dynamic mount 18 and utilizes back electromotive force (i.e., regenerative force) generated by induced current to affect movement of the electro-dynamic mount 18 operatively connected to the engine 12, and thereby mitigate the transmission of noise and vibration from the engine to the vehicle body 14. The system 16 can be entirely passive. In an alternate embodiment shown in FIG. 4, the electro-dynamic mount 18 can be actively controlled. Although only one system 16 is shown operatively connected to the engine 12, similar systems 16 can be used at additional locations at which the engine 12 is mounted relative to the body 14.

The system 16 includes a housing 20 defining an internal cavity 22. A first compliant member 24 is attached to the housing 20 and further defines the internal cavity 22. The housing 20 may be a rigid material, such as steel, and the compliant member 24 is a flexible and resilient material such as rubber. The housing 20 is shown in a schematic cross-sectional view, and can have a circular, square, or rectangular periphery, or any other suitable shape. The compliant member 24 has a complementary shape allowing an outer periphery 26 of the compliant member 24 to be frictionally engaged with or secured to an inner periphery 28 of the housing 20 by adhesive bonding, structural adhesive, fasteners, or any other suitable means. A center support 30 is secured to the compliant member 24 and is secured to a bracket 32 by a fastener 34. The bracket 32 is secured to a boss 36 of the engine 12 by a separate fastener 38. Any other suitable means can be used to secure the engine 12 to the compliant member 24 such that vertical movement of the engine 12, resulting in an applied force 39 (represented by a double-sided arrow) on the system 16, is transmitted to the compliant member 24.

The electro-dynamic mount 18 includes a magnet 40 operatively fixed to the housing 20 in the cavity 22. The magnet 40 is a permanent magnet. By way of nonlimiting example, it can be assumed that the magnet 40 is arranged in FIG. 1 so that it has a magnetic field with field lines that extend out of the page in FIG. 1. The electro-dynamic mount 18 also includes a coil 42 positioned in the cavity 22. The coil 42 is an annular coil that is configured to be movable relative to the magnet 40 in the magnetic field in response to movement of the compliant member 24 relative to the housing 20 as further described herein. In another embodiment within the scope of the claimed invention, the coil 42 and the magnet 40 can be configured to move the magnet 40 relative to the coil 42 in response to movement of the compliant member 24 relative to the housing 20. In such an embodiment, the coil 42 would be fixed to the housing 20, and the magnet 40 would be operatively connected to the compliant member 24.

The coil 42 is wound in an annular configuration and has a first end 44A and a second end 44B that are electrically connected by wiring to a resistor 46 to form a closed electrical circuit 48. Vertical movement of the coil 42 relative to the magnet 40 and the field of the magnet 40 will cause a change in magnetic flux passing through the coil 42. Because the resistor 46 is connected to form a closed circuit with the coil 42, a current will be induced to flow in the circuit 48 through the coil 42 and the resistor 46 due to the change in magnetic flux. According to Lenz's law, the induced current has an electromotive force that opposes the force that caused the change in magnetic flux (i.e., a force that opposes the force that caused the coil 42 to move).

The electro-dynamic mount 18 includes a diaphragm 50 extending to an inner housing support 58 of the housing 20 at an outer periphery 52 and operatively connected to the coil 42 at an inner periphery 54 through a center mount 56. Inner housing supports 58 structurally support the diaphragm 50 and the magnet 40 relative to the housing 20. The diaphragm 50 separates the internal cavity 22 into a first portion 60 and a second portion 62. The first portion 60 is between the compliant member 24 and the diaphragm 50 and contains a first incompressible fluid 64, such as hydraulic fluid including glycol. The second portion 62 contains the magnet 40, the coil 42, and the resistor 46 and is filled with air. Forces acting on the compliant member 24 are transferred to the diaphragm 50 by the first fluid 64. Because the coil 42 is fixed to the diaphragm 50 by the mount 56, the coil 42 also moves when the diaphragm 50 moves due to the forces on the compliant member 24. The degree of movement of the coil 42 depends on the stiffness of the electro-dynamic mount 18, which is partially dependent on the stiffness of the diaphragm 50.

Movement of the coil 42 in the magnetic field induces a current in the circuit 48 that creates an opposing magnetic field proportional to the change in magnetic flux through the coil 42. In other words, the opposing magnetic field is opposite to the "parent" magnetic field of the magnet 40 and is proportional to the movement of the coil 42 in the parent magnetic field. The opposing magnetic field is associated with a net force on the coil 42, which is opposite and out-of-phase at all times to the direction of movement of the coil 42. Because the movement of the coil 42 is proportional to the movement of the engine 12, this results in an opposing force on the coil. The opposing force is transmitted to the body 14, which reduces the transmitted force due to the movement of the engine 12. Vibration and/or noise of the engine 12 may be sinusoidal, causing the induced current and opposing force to be sinusoidal, and in direct opposition to the applied force 39. Accordingly, although the system 16 is entirely passive in that it is without an electronic controller to control transmitted noise and vibration based on feedback of operating conditions, the system 16 provides vibration mitigation that is automatically in proportion to the varying applied force 39 because the induced current is proportionate to the change in magnetic flux through the coil 42.

FIG. 2 schematically represents the opposing force F resulting from the induced current in the coil 42 when the coil 42 moves downward toward the magnet 40 from a position A to a position B (shown in phantom) due to the applied force 39 of FIG. 1 being momentarily downward. Only the upper extent 70 of the coil 42 at ends 44A, 44B is shown. The magnetic flux increases as the coil 42 moves through more of the toriodal-shaped parent magnetic field 72 (only a portion of which is shown). The induced current I is clockwise in the coil 42, as the induced current I has an opposing magnetic field that opposes the change in magnetic flux that induced the current, and a resulting opposing force F that opposes the applied force 39.

Referring again to FIG. 1, an optional hydraulic mount 76, also referred to as a hydraulic damper, is placed in parallel with the electro-dynamic mount 18 in the housing 20 to further mitigate the transmission of engine noise and vibration to the body 14. The hydraulic mount 76 is positioned in parallel with the diaphragm 50 in the housing 20. The hydraulic mount 76 includes the inner housing support 58 that forms a passage 78. The inner housing support 58 and passage 78 function as an inertia track that divides the first portion 60 of the internal cavity 22 into a first fluid cavity 80 and a second fluid cavity 82, with the passage 78 fluidly connecting the first fluid cavity 80 with the second fluid cavity 82.

The hydraulic mount 76 includes a second compliant member 84 positioned in the second fluid cavity 82. The second compliant member 84 is shown as bellows secured to the housing 20 and the support 58, but can be any suitable compliant member. The second compliant member 84 is flexible, and is therefore operable to vary a volume of the second fluid cavity 82 in response to flow of the first fluid 64 through the passage 78. When the first compliant member 24 moves due to the vibrations of the engine 12, the incompressible fluid 64 is forced through the passage 78 between the first fluid cavity 80 and the second fluid cavity 82. The arrows 77 represent the fluid 64 moving from the first cavity 80 to the second cavity 82, consistent with a momentary downward force 39 on the first compliant member 24. In that instance, the second compliant member 84 flexes outward toward the bottom of the housing 20 into an air cavity 86 on an opposite side of the second compliant member 84, expanding the second fluid cavity 82. Air can be forced out of the air cavity 86 to atmosphere through one or more openings 88 in the housing 20. Fluid 64 can also move from the second fluid cavity 82 to the first fluid cavity 80 when the momentary force 39 moves the first compliant member 24 upward, causing the second fluid cavity 82 to decrease in size and the second compliant member 84 to flex away from the housing 20, drawing air into the air cavity 86 through the openings 88. Because the passage 78 is a restriction between the fluid cavities 80, 82, and fluid 64 must travel through the restrictive passage 78 when the first compliant member 24 moves, the passage 78 slows movement of the fluid 64 between the cavities 80, 82, and further mitigates movement of the first compliant member 24 relative to the housing 20, lessening the transmission of noise and vibration to the body 14.

Although the hydraulic mount 76 is shown in parallel with the electro-dynamic mount 18 in the vibration and noise management system 16 of FIG. 1, an alternate vibration and noise management system 16A shown in FIG. 3 includes only the passive electro-dynamic mount 18 with the resistor 46 and without an electronic controller. The electro-dynamic mount 18 of the system 16A includes the diaphragm 50, center mount 56, support member 58, housing 20, coil 42, and magnet 40. The support member 58 as used in system 16A would not include passage 78. The diaphragm 50 could be larger in system 16A to extend to the inner periphery 28 of the housing 20, and the support member 58 could be eliminated, as there is no hydraulic mount 76.

FIG. 4 shows an alternative vibration and noise management system 16B for a vehicle such as vehicle 10, in which active control of vibration and noise management is available in addition to the passive control possible with the electro-dynamic mount 18A with resistor 46. Specifically, a switch 90 is actively controlled by a processor 92 to be selectively moved to implement a passive mode or an active mode in response to predetermined vehicle operating parameters. The switch 90 and the processor 92 are shown integrated in an electronic control module 85 (also referred to herein as an electronic controller). The switch 90 and the resistor 46 are provided on a switching module 89 included in the electronic control module 85. Alternatively, the switching module 89 could be separate from the electronic control module 85. The processor 92 is operatively connected to the switch 90 by the conductors 96, 98 over which electrical signals and electrical current can be communicated. When in a first position that enables the active mode (shown in phantom as 90A in FIG. 4), the switch 90 closes an active mode circuit to enable current from a battery 91 to be supplied to the coil of the electro-dynamic mount 18A (like coil 42 shown in FIG. 1) along conductor 87, and at the same time opens a passive mode circuit that includes the resistor 46. The switch 90 is moved by the processor 92 according to an algorithm stored on the processor 92 that is executed by the processor 92. The electronic control module 85 is grounded at ground G. The algorithm can be configured so that the processor 92 moves the switch 90 to the first position 90A in response to a control signal 93 from an engine control module (ECM) 94 or in response to other input signals 95 to enable current from the battery 91 to be supplied to the coil 42 regardless of relative movement of the coil 42, if desired. For example, current can be supplied to the coil 42 even when there is no relative motion between the coil 42 and the magnet 40 to thereby vary the stiffness of the electro-dynamic mount 18A. The algorithm can also be configured so that the battery 91 provides current to the coil 42 when the coil 42 is moving due to force 39 on the compliant member 24 of FIG. 1, with the supplied current being configured to have a direction in the coil 42 that generates an opposing force to the applied force 39. In other words, the induced current generated by movement of the coil 42 in the parent field of the magnet 40 that occurs automatically can be alternated between active and passive control. Access to the coil 42 of the mount 18A can be through an electrical connector that extends through a housing 20 like housing 20 of FIG. 1. The conductors 97, 99 would connect to the coil 42 through the electrical connector. The electronic control module 85 including the switch 90 and the resistor 46 would be moved outside of the housing 20.

The processor 92 may be configured to move the switch 90 based on vehicle operating parameters input as signals 93 to the electronic control module 85 from the ECM 94, and as signals 95 from other sensors or control modules (not shown) on the vehicle that are in electronic communication with the electronic control module 85. In the embodiment shown, the vehicle operating parameters supplied as input signals 93 by the ECM 94 include, by way of nonlimiting example, the pulses per revolution of the engine 12 of FIG. 1. By way of nonlimiting example, additional vehicle operating parameters supplied as input signals 93 or 95 to the electronic control module 85 include engine speed (such as in revolutions per minute), engine torque (such as in Newton-meters (N-m)), gear state of a transmission operatively connected to the vehicle, and engine temperature.

The stored algorithm includes determining one or more operating parameters of the vehicle 10, based on the one or more input signals 93, 95. The processor 92 then enables electrical current to be provided from the battery 91 to the coil 42 of the electro-dynamic mount 18A when the one of more operating parameters are within a first predetermined range of values such as a frequency of vibration greater than a predetermined frequency. The electrical current is provided from the battery 91 when the processor 92 moves the switch 90 to the first position 90A. When the switch 90 is in the first position 90A, the resistor 46 is not operatively connected to the coil 42 (i.e., the resistor 46 is operatively disconnected from the coil 42). Additionally, if the switch 90 is in the first position 90A, and the algorithm determines that the operating parameters are not within the first predetermined range of values, then the processor 92 will move the switch 90 to a second position 90B, which enables the passive mode in which the battery 91 is not operatively connected to the electro-dynamic mount 18A (i.e., the battery 91 is operatively disconnected from the coil 42) and the electro-dynamic mount 18A is in a closed circuit with the resistor 46.

By way of nonlimiting example, the algorithm can determine from the input signals 93, 95 whether the frequency of engine vibration is expected to be within a first range of frequencies, or within a second range of frequencies. For example, the first range of frequencies can be from 0-200 Hertz (referred to herein as a second predetermined range of values), and the second range of frequencies can include frequencies greater than 200 Hertz (referred to herein as a first predetermined range of values), although other frequency ranges can instead be used. In the first range of frequencies, the opposing force generated by the induced current in the coil 42 of the electro-dynamic mount 18 with resistor 46 connected in closed circuit 48 may be sufficient to mitigate vibrations. Vibration management of the system 16B is thus entirely passive in the first range of frequencies. The switch 90 is in the second position 90B during the first range of frequencies. In the second range of frequencies, the processor 92 moves the switch 90 to the first position 90A so that the resistor circuit is opened and current is actively supplied from the battery 91 in the active mode such as to generate motion of the coil of the electro-dynamic mount 18, thereby optionally increasing the opposing force. The hydraulic mount 76 shown in FIG. 1 can optionally be used in parallel with the electro-dynamic mount 18A in the actively controlled system 16B.

Figure 5:
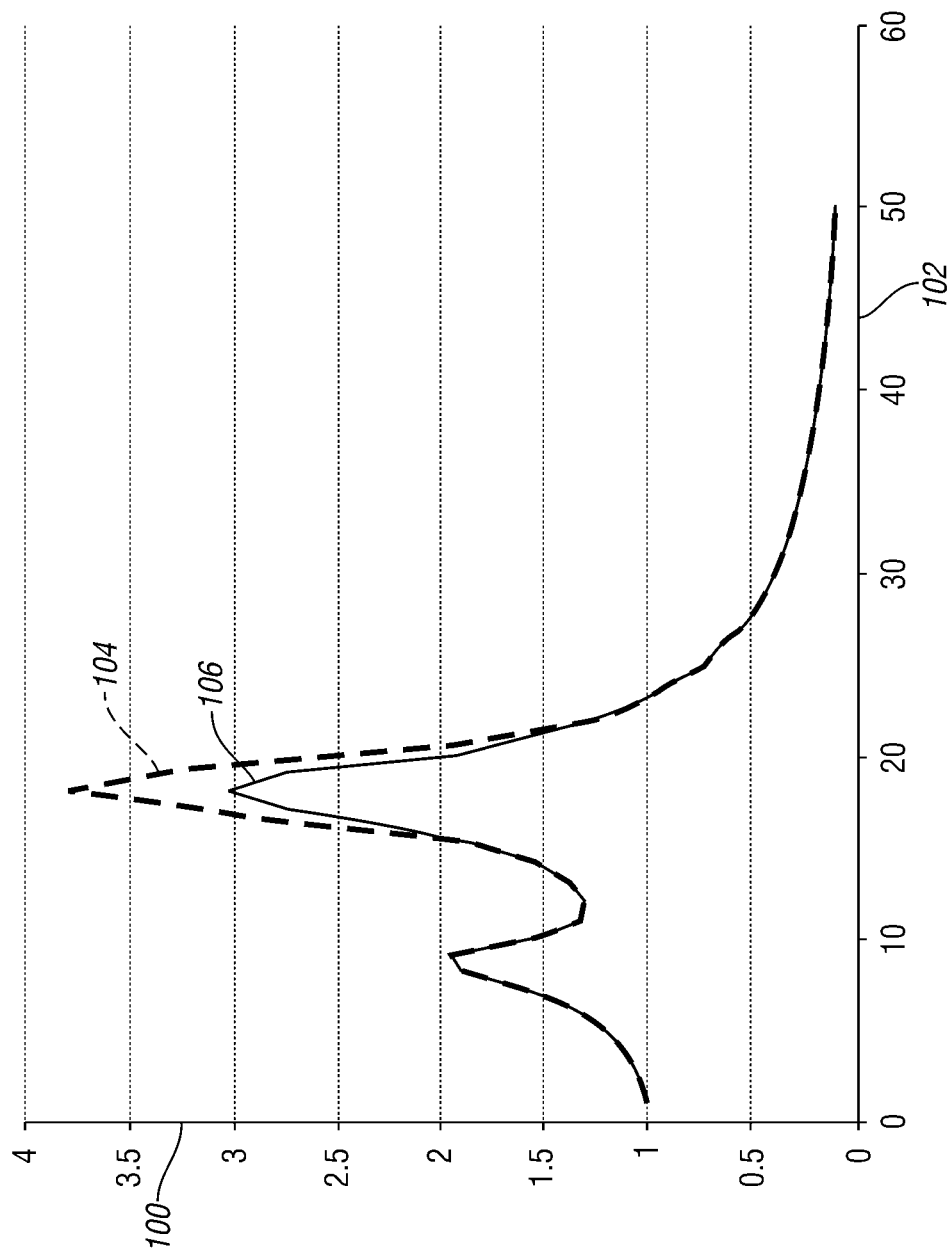
FIG. 5 is a schematic plot showing transmissibility of engine vibration to the vehicle body versus frequency of the vibration of the engine for the system of FIG. 1 with and without the resistor.

FIG. 5 illustrates the effect of adding the resistor 46 to the electro-dynamic mount 18 of FIG. 1. The plot of FIG. 5 shows a mathematical model indicating the expected transmissibility 100 of engine vibration to the vehicle body 14 on the Y-axis as a dimensionless ratio of transmitted force on the body 14 to the input force 39 of the engine 12 on the compliant member 24. The axial frequency 102 in Hertz of the vibration of the engine 12 is indicated on the X-axis (where axial frequency is the frequency of vibration about an axis through the crankshaft of the engine 12). Resonance of the mount 18 causes the transmissibility 100 to be greater than one over a certain axial frequency range. Curve 104 shows the transmissibility 100 when the electro-dynamic mount 18 of FIG. 1 does not include the resistor 46, so that the coil 42 is not in a closed circuit and no induced current can flow in the coil 42. Curve 106 shows the transmissibility 100 when the resistor 46 is added in closed circuit to the coil 42, and indicates that transmissibility 100 is reduced especially in the range of frequencies near the resonant frequency of the mount 18 due to the opposing force of the induced current.

Accordingly, by adding a resistor 46 to create a closed circuit with the coil 42 in an electro-dynamic mount 18, passive noise and vibration management is possible such as in systems 16 and 16A. Optionally, noise and vibration can be actively managed by adding a switch 90 that is controlled to enable selectively adding current to the coil 42 from a battery 91 to the electro-dynamic mount 18A and/or to switch to a passive operation of the electro-dynamic mount 18A, such as in system 16B.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A system for managing noise and vibration in a vehicle comprising:
   a housing defining an internal cavity;
   a first compliant member attached to the housing and further defining the internal cavity;
   a magnet having a magnetic field;
   a coil; wherein one of the magnet and the coil is operatively fixed to the housing in the cavity;
   wherein the other of the magnet and the coil is positioned in the cavity and is configured to move relative to the one of the magnet and the coil in response to movement of the first compliant member relative to the housing;
   a resistor in electrical communication with the coil to form an electrical circuit; relative movement of said other of the magnet and the coil inducing a current in the circuit that creates an opposing magnetic field;
   a diaphragm operatively connected to the coil and at least partially separating the internal cavity into a first portion and a second portion; wherein the first portion is between the first compliant member and the diaphragm and contains a first fluid, and the second portion contains the magnet, the coil, and the resistor; wherein forces acting on the first compliant member are transferred to the diaphragm by the first fluid to thereby move said one of the magnet and the coil relative to said other of the magnet and the coil;
   a hydraulic damper positioned in parallel with the diaphragm in the housing; wherein the hydraulic damper has:
      a structure positioned in the first portion that defines a passage and that divides the first portion into a first fluid cavity and a second fluid cavity, with the passage fluidly connecting the first fluid cavity to the second fluid cavity; and
      a second compliant member positioned in the second fluid cavity and operable to vary a volume of the second fluid cavity in response to flow of the first fluid through the passage.

2. The system of claim 1, wherein the circuit is without an electronic controller.

3. The system of claim 1, further comprising:
   a battery;
   a switch movable between a first position and a second position to connect and disconnect the battery from the coil; and
   a processor operatively connected to the switch and to the battery and configured to execute a stored algorithm to move the switch to the first position in response to at least one predetermined operating parameter, thereby providing current from the battery to the coil only when the switch is in the first position to affect movement or stiffness of the coil based on said at least one predetermined operating parameter.

4. The system of claim 3, wherein the processor and the switch are integrated as an electronic control module.

5. A vehicle comprising:
   a first vehicle component and a second vehicle component;
   a housing operatively fixed to the second vehicle component and defining an internal cavity;
   a first compliant member attached to the housing and further defining the internal cavity;
   wherein the first vehicle component is operatively supported by the first compliant member relative to the second vehicle component such that the first compliant member moves when the first vehicle component moves relative to the second vehicle component;
   a magnet operatively fixed to the housing and having a magnetic field;
   a coil positioned in the cavity and configured to such that there is relative movement between the coil and the magnet in the magnetic field in response to movement of the first compliant member relative to the housing;
   a resistor in electrical communication with the coil to form an electrical circuit; relative movement between the coil and the magnet in the magnetic field inducing a current in the circuit that creates an opposing magnetic field proportional to the relative movement between the coil and the magnet in the magnetic field;
   a diaphragm operatively connected to the coil and at least partially separating the internal cavity into a first portion and a second portion; wherein the first portion is between the first compliant member and the diaphragm and contains a first fluid; wherein the second portion contains the magnet, the coil, and the resistor;
   a hydraulic damper positioned in parallel with the diaphragm in the housing; wherein the hydraulic damper has:
      a structure positioned in the first portion defining a passage and that divides the first portion into a first fluid cavity and a second fluid cavity with the passage fluidly connecting the first fluid cavity with the second fluid cavity; and
      a second compliant member positioned in the second fluid cavity and operable to vary a volume of the second fluid cavity in response to flow of the first fluid through the passage.

6. The vehicle of claim 5, wherein the circuit is without an electronic controller.

7. The vehicle of claim 5, further comprising:
   a battery;

a switch selectively movable between a first position and a second position; wherein the coil is operatively connected to the battery when the switch is in the first position; wherein the coil is operatively connected to the resistor when the switch is in the second position; and a processor operatively connected to the switch and to the battery and configured to execute a stored algorithm to selectively move the switch to the first position in response to at least one predetermined vehicle operating parameter, thereby providing current from the battery to the coil only when the switch is in the first position to affect movement of or stiffness of the coil based on said at least one predetermined vehicle operating parameter.

8. The vehicle of claim 7, wherein the processor and the switch are integrated as an electronic control module.

9. The vehicle of claim 7, wherein said at least one predetermined vehicle operating parameter is a frequency of vibration of one of the vehicle components; and wherein the switch is moved to the first position when the frequency of vibration of said one of the vehicle components is greater than a predetermined frequency of vibration.

10. A method of managing noise and vibration in a vehicle comprising:
determining at least one operating parameter of the vehicle;
providing electrical current from a battery to a coil of an electro-dynamic mount when said at least one operating parameter is within a first predetermined range of values; wherein the electro-dynamic mount operatively connects a first vehicle component to a second vehicle component and the current in the coil provided from the battery to the coil creates a magnetic field that opposes movement of a magnet relative to the coil; and
operatively connecting a resistor to the coil in a closed electrical circuit when said at least one operating parameter is within a second predetermined range of values, electrical current thereby being induced in the circuit due to relative movement of the coil in a magnetic field of the magnet;
wherein the electro-dynamic mount includes:
a housing operatively fixed to the second vehicle component and defining an internal cavity;
a compliant member attached to the housing and further defining the internal cavity;
wherein the first vehicle component is operatively supported by the compliant member relative to the second vehicle component such that the compliant member moves when the first vehicle component moves relative to the second vehicle component;
a diaphragm operatively connected to the coil and at least partially separating the internal cavity into a first portion and a second portion; wherein the first portion is between the compliant member and the diaphragm and contains a first fluid; and wherein the second portion contains the magnet, the coil, and the resistor
wherein the compliant member is a first compliant member, and further comprising:
a hydraulic damper positioned in parallel with the diaphragm in the housing; wherein the hydraulic damper has:
a structure positioned in the first portion defining a passage and that divides the first portion into a first fluid cavity and a second fluid cavity with the passage fluidly connecting the first fluid cavity with the second fluid cavity; and
a second compliant member positioned in the second fluid cavity and operable to vary a volume of the second fluid cavity in response to flow of the first fluid through the passage.

11. The method of claim 10, wherein said providing electrical current is by moving a switch to a first position operatively connecting the battery and the coil; wherein the resistor is operatively disconnected from the coil when the switch is in the first position;
wherein said operatively connecting the resistor to the coil is by moving the switch to a second position; and wherein the battery is operatively disconnected from the coil when the switch is in the second position.

12. The method of claim 10, wherein said at least one operating parameter is a frequency of vibration of one of the first vehicle component and the second vehicle component; and wherein the first predetermined range of values is a frequency range above a predetermined frequency.

* * * * *